United States Patent
Bender et al.

(10) Patent No.: US 11,713,494 B2
(45) Date of Patent: Aug. 1, 2023

(54) METHODS FOR EXTRACTING LI AND NI FROM A SOLUTION

(71) Applicant: BASF Corporation, Florham Park, NJ (US)

(72) Inventors: Jack Bender, Tucson, AZ (US); William C. Mays, Southfield, MI (US); Tinoush Dinn, Beachwood, OH (US); Martin L. Panchula, Beachwood, OH (US); Dieter G. Von Deak, Beachwood, OH (US)

(73) Assignee: BASF Corporation, Florham Park, NJ (US)

( * ) Notice: Subject to any disclaimer, the term of this patent is extended or adjusted under 35 U.S.C. 154(b) by 231 days.

(21) Appl. No.: 17/088,808

(22) Filed: Nov. 4, 2020

(65) Prior Publication Data

US 2021/0130927 A1 May 6, 2021

Related U.S. Application Data

(60) Provisional application No. 62/930,186, filed on Nov. 4, 2019.

(51) Int. Cl.
| | |
|---|---|
| C22B 23/00 | (2006.01) |
| C22B 3/00 | (2006.01) |
| C22B 26/12 | (2006.01) |
| C22B 3/30 | (2006.01) |
| C22B 3/38 | (2006.01) |

(52) U.S. Cl.
CPC ............ *C22B 23/0461* (2013.01); *C22B 3/30* (2021.05); *C22B 3/3842* (2021.05); *C22B 26/12* (2013.01)

(58) Field of Classification Search
CPC ... C22B 26/12; C22B 23/0461; C22B 3/3842; C22B 3/3844; C22B 3/3846; C22B 3/40; C22B 3/30; C22B 3/322; C22B 3/324; C22B 3/326; C22B 3/382; C22B 3/306; H01M 10/54
See application file for complete search history.

(56) References Cited

U.S. PATENT DOCUMENTS

2018/0261894 A1    9/2018    Wang et al.

FOREIGN PATENT DOCUMENTS

| CN | 107978814 A | 5/2018 |
|---|---|---|
| JP | 2007122885 A | 5/2007 |
| KR | 101086769 B1 | 11/2011 |
| KR | 2015-0002963 A  * | 1/2015 |
| KR | 1020150002963 | 1/2015 |

OTHER PUBLICATIONS

International Search Report and Written Opinion for PCT/US2020/058765 dated Feb. 23, 2021.

* cited by examiner

*Primary Examiner* — Steven J Bos
(74) *Attorney, Agent, or Firm* — DLA Piper LLP (US)

(57) ABSTRACT

Provided are processes for extracting lithium and optionally nickel from a Nickel(II)/Lithium(I) ($Ni^{2+}/Li^+$) solution. The extraction is optionally performed in a series of steps with counterflow of aqueous and organic flows to thereby produce a lithium poor solution. The lithium poor solution may be treated so that remaining Ni in the lithium poor solution may be directly precipitated therefrom in the form of a Ni salt. Once complete, the process provides for recoverable nickel and/or lithium that may be recycled into batteries or sold for other uses.

26 Claims, 3 Drawing Sheets

METHODS FOR EXTRACTING LI AND NI FROM A SOLUTION

CROSS REFERENCE TO RELATED APPLICATIONS

This application depends from and claims priority to U.S. Provisional Application No. 62/930,186 filed Nov. 4, 2019, the entire contents of which are incorporated herein by reference.

FIELD

The disclosure relates to methods of recovering elements from a solution. More specifically, the disclosure in some aspects relates to methods of recovering lithium and nickel such as that optionally produced from a waste stream following delithiation of a lithium nickel oxide (e.g. $LiNiO_2$) material.

BACKGROUND

Lithium-ion batteries are increasingly used in essential applications such as powering electric vehicles, cellular telephones, and cameras. The increased application of such batteries in wide-ranging technological fields has enhanced the necessity of extracting valuable elements, such as nickel and lithium, produced as a waste stream from the production of these materials or from spent lithiated batteries in both a cost and time efficient manner. Materials that are extracted from these waste streams can be recycled back into the manufacturing process or sold and implemented in other related processes.

Unfortunately, current extraction or recycling methods often utilize various oxidizers that generate a large amount of waste that must be processed, thereby requiring clean up time and costs. Moreover, these methods may not provide for effective separation of the extracted components, thereby making individual recovery of the materials impossible. Such deficiencies decrease the amount of material that may be recovered and also increase both the amount of waste produced and the costs associated with extraction of the battery materials.

Multi-stage co-extractions have been attempted so as to recover multiple materials, such as both nickel and lithium, at the same time. These methods, while able to produce individually extracted materials, require four co-extraction stages and six total steps in order to produce the individually extracted materials. As such, the current co-extraction processes are very time consuming as each step must be performed in isolation. Moreover, the amount of solvent needed during the co-extraction process is monetarily expensive as different solvents are needed during each step.

As such, new methods are needed to improve the efficiency and output of extracting materials, such as nickel and lithium, from a battery waste stream.

SUMMARY

The following summary is provided to facilitate an understanding of some of the innovative features unique to the present disclosure and is not intended to be a full description. A full appreciation of the various aspects of the disclosure can be gained by taking the entire specification, claims, drawings, and abstract as a whole.

Provided are processes for extracting lithium and nickel from a Nickel(II)/Lithium(I) ($Ni^{2+}/Li^+$) solution optionally supplied as the result of a delithiation of materials suitable for use in a lithium ion battery. It was found that certain loop processes allow for virtually complete recovery of lithium and optionally nickel individually in both a time efficient and cost effective manner. The processes for extracting lithium and nickel from a $Ni^{2+}/Li^+$ solution optionally include providing a $Ni^{2+}/Li^+$ solution including an amount of lithium and an amount of nickel and optionally treating the $Ni^{2+}/Li^+$ solution with an acid or alkaline agent (pH adjusting agent) to adjust the pH of the $Ni^{2+}/Li^+$ solution to between about 1.0 and about 10.0, optionally to a pH below 7.0. The process includes treating the $Ni^{2+}/Li^+$ solution with a lithium selective extractant, the lithium selective extractant being suitable to extract lithium from the $Ni^{2+}/Li^+$ solution at the pH, thereby producing a $Ni^{2+}$ solution (lithium poor solution) optionally with less than 1000 parts per million $Li^+$.

In some aspects, the pH of the $Ni^{2+}/Li^+$ solution following combination with the pH adjusting agent is less than 6.0. The pH adjusting agent is optionally selected from the group consisting of hydrochloric acid, sodium hydroxide, lithium hydroxide, potassium hydroxide, aqua ammonia, and a combination of at least two of the forgoing. Optionally, a pH adjusting agent is not used in the system and the $Ni^{2+}/Li^+$ solution is subjected directly to extraction.

In some aspects, a lithium selective extractant is optionally an oxime, a trialkylphosphine oxide, an acid, or any combination thereof. Optionally, a lithium selective extractant is 2-hydroxy-5-nonylacetophenone oxime, LIX 54-100, LIX 55, CYANEX 936 and CYANEX 923, or any blend of two or more of any of these reagents.

In some aspects, the pH of the $Ni^{2+}/Li^+$ solution when treating the $Ni^{2+}/Li^+$ solution with a lithium selective extractant is from 1.0 to 10.0. The step of treating the $Ni^{2+}/Li^+$ solution with a nickel selective extractant is optionally performed at a pH of less than 7.0, optionally resulting from the combination with the pH adjusting agent.

Optionally, the lithium selective extractant further comprises a hydrocarbon. The hydrocarbon is optionally selected from the group consisting of kerosene, paraffin, naphthene, and a combination of at least two of the forgoing. Optionally, the lithium selective extractant and hydrocarbon are present at 10:90 percent by volume to 30:70 percent by volume.

The resulting lithium poor solution resulting from the lithium extraction is optionally less than 1000 parts per million Li, optionally less than 100 parts per million Li, optionally less than 10 parts per million Li.

In some aspects, the process further includes treating the resulting lithium rich solution with a carbonation agent to produce lithium salt. The carbonation agent is optionally selected from the group consisting of carbon dioxide ($CO_2$), ammonium, sodium carbonate, ammonium carbonate, bicarbonate, and a combination of at least two of the forgoing. Optionally, the lithium carbonate is filtered and washed and may be reused for subsequent processes.

The resulting lithium poor solution may be subjected to further isolation of Ni. Optionally, the lithium poor solution is treated with a carbonation agent or pH adjusting agent to produce a precipitated nickel salt that may be collected. The carbonation agent is optionally selected from the group consisting of carbon dioxide ($CO_2$), ammonium, sodium carbonate, ammonium carbonate, bicarbonate, and a combination of at least two of the forgoing. Optionally, the nickel carbonate is filtered and washed.

BRIEF DESCRIPTION OF THE DRAWINGS

The aspects of the disclosure set forth in the drawings are illustrative and exemplary in nature and not intended to limit the subject matter defined by the claims. The following detailed description of the illustrative aspects of the disclosure can be understood when read in conjunction with the following drawings, and in which:

DETAILED DESCRIPTION

Figure 1:
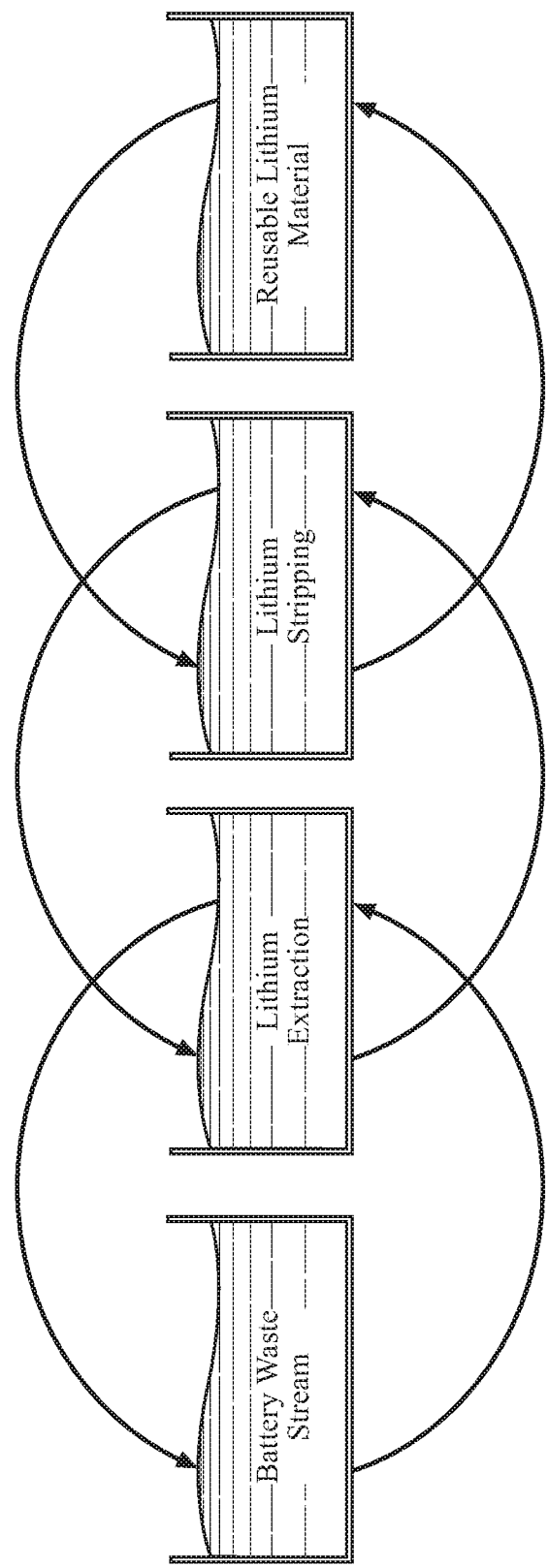
FIG. 1 is an illustrative schematic of a process according to some aspects illustrating an optional continuous extraction of materials from an exemplary waste or other material.

Provided herein are processes for separating lithium and optionally nickel from an input stream where the input stream is optionally waste following the delithiation of a $LiNiO_2$ material. The processes allows efficient and robust recovery of lithium and optionally nickel from these streams such that the resulting isolated nickel and lithium may be used for subsequent processes or for the formation of additional electrochemically active materials. The processes as provided herein according to some aspects of this disclosure utilize one or more continuous loop systems of counterflow organic and aqueous phases so as to be able to efficiently isolate and extract nickel, lithium or both from an input stream. A schematic of an overall process according to some aspects is illustrated in FIG. 1.

In some aspects, a process employs a continuous and optionally multi-step extraction whereby each extraction need not be performed in isolation from other steps so as to provide a much more robust overall extraction process that optionally operates in less time and producing less waste than prior processes. In general, a waste material is provided as a source of Li and optionally Ni for extraction or isolation by the processes as provided herein. The term "waste" as used herein is defined as a liquid or solid composition that includes both $Ni^{2+}$ and $Li^+$ with either or both at a concentration suitable for extraction. The term "waste" is not required to be that which is a used product of another prior process, but may be the result of an upstream process such as the leaching of Ni or Li from a prior processing step of a desired material. Optionally, waste as used herein is a waste stream from a continuous or discontinuous leaching of Ni and Li as produced during the delithiation of a lithium nickel oxide optionally with a mineral acid, optionally that used for the formation of a cathode in a primary or secondary electrochemical cell.

A waste material in the form of a $Ni^{2+}/Li^+$ solution is optionally subjected to a continuous multistage extraction process that may optionally include one or more extraction stages, one or more wash stages, and one or more strip stages, with any or all of the foregoing assembled into a continuous circuit. Optionally, a circuit design includes one or more wash stages. Optionally, the design includes 2 or more wash stages. The number of wash stages is as desired by a user and is not necessarily limited; however, in some aspects only a single wash stage is used.

A fluid circuit includes one or more extraction stages. The number of extraction stages is optionally from 1 to 10, or any value or range therebetween. Optionally, the number of extraction stages is from 2 to 10, 2 to 8, 2 to 6, 3 to 10, 3 to 8, 3 to 6. Optionally the number of extraction stages is 2, 3, 4, 5, 6, 7, or more. Optionally, the number of extraction stages is 6 or fewer, optionally 5 or fewer. The number of extraction stages in circuit allows for efficient extraction of Li in each stage and the production of a single Li rich solution that may then be subjected to further processing for obtaining the isolated Li suitable for use in subsequent production processes. The resulting lithium poor solution ($Ni^{2+}$ solution) may then also be subjected subsequent isolation of the Ni.

Figure 2:
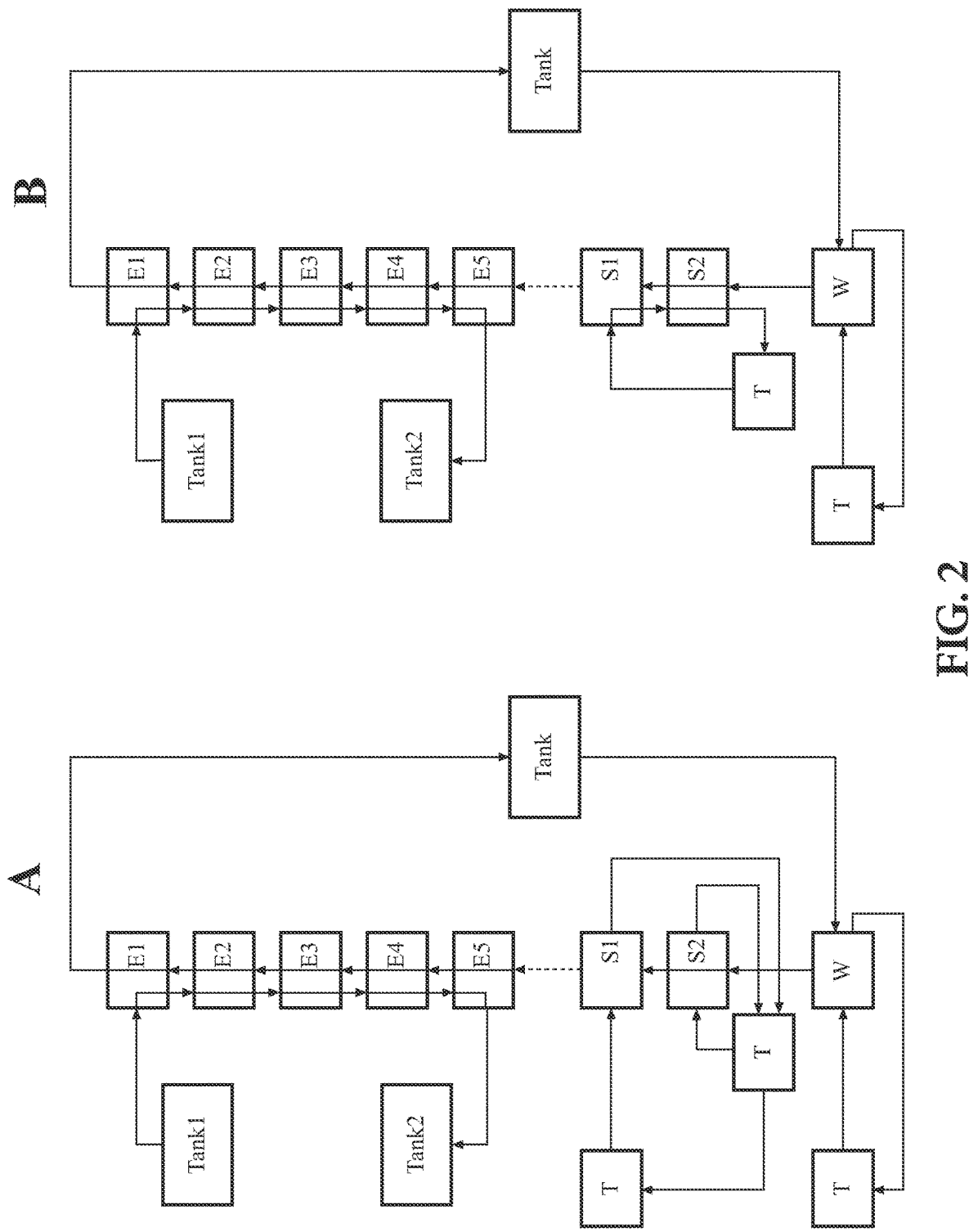
FIG. 2 illustrates a flow diagram of the processes as provided herein illustrating the various stages of extraction (E), washing (W), and stripping (S) with multiple extraction stages and multiple strip stages illustrating the flow of the organic stage, the input $Ni^{2+}/Li^{2+}$ solution, and the tanks that collect the output of the lithium extraction steps of the processes as provided herein illustrated in a process whereby the strip steps are in parallel (A), or series (B)

Whether isolating lithium from a $Ni^{2+}/Li^+$ solution or a metal poor solution, each of the extraction stages may be housed in a mixer-settler that may then optionally introduce a pH adjusting agent, a Li selective extractant, or both. In an example where there are 5 extraction stages, 5 mixer settlers are fluidly connected such that product from one extraction stage can be passed to the subsequent mixer-settler and organic extraction solvent (including one or more Li selective extractants) passed in the opposite direction in series to promote extraction of the Li as the waste stream is moved from one extraction stage to the next. An exemplary generalized process is exemplified in FIGS. 2A and B with the difference that FIG. 2A illustrates strip stages (S1 and S2) employed in parallel and FIG. 2B depicts strip stages (S1 and S2) employed in series. As is illustrated in FIGS. 2A and B, a tank that includes a waste material that includes Ni and Li (Tank 1) and used as the feed through the system. The waste material is fed from extraction stage E1 in a first mixer settler and combined with lithium selective extractant moving the opposite direction in the series. As such, the waste material first contacts the lithium selective extractant in stage E1 and moves from E1 to E5, and the Li selective extractant first enters the extraction stages at E5 moving from E5 to E1. After reaction in stage E1, the Li depleted aqueous phase is moved to E2 and subsequently to E3, E4, and E5 so that Li is continually depleted and concentrated in the organic phase that moves in the opposite direction. The Li rich organic phase may then be optionally scrubbed in a wash stage (W) and transferred directly into the strip stage(s).

The Li rich organic phase is optionally washed and then transferred to the strip stages S2 and S1, optionally in that order, to strip the Li from the Li selective extractant solution (organic) whereby each of the strip stages is housed in a separate mixer settler. Optionally, the number of strip stages is 1 or more, optionally 2 or more. The number of strip stages is optionally 4 or fewer, optionally 3 or fewer, optionally 2 or fewer. Similar to above for the extraction stages, the strip stages include a countercurrent flow of aqueous strip solution (e.g. acid) to protonate the Li selective extractant and strip the Li from the Li rich organic phase and produce a Li salt.

Within each strip stage, the Li rich organic phase is subjected to a stripping solution that includes an acid to exchange Li with hydrogen and permit the purified and concentrated lithium to pass to the strip aqueous phase for production of a Li salt that can either itself be used as an input material for subsequent manufacturing processes, or for subsequent further elemental isolation of the Li (e.g. by an electrodeposition process or precipitation) for subsequent use. The Li poor organic phase may then be optionally scrubbed in a wash stage and transferred back to a storage tank and/or transferred directly into the Li extraction stages for subsequent extraction of Li from waste material.

Figure 3:
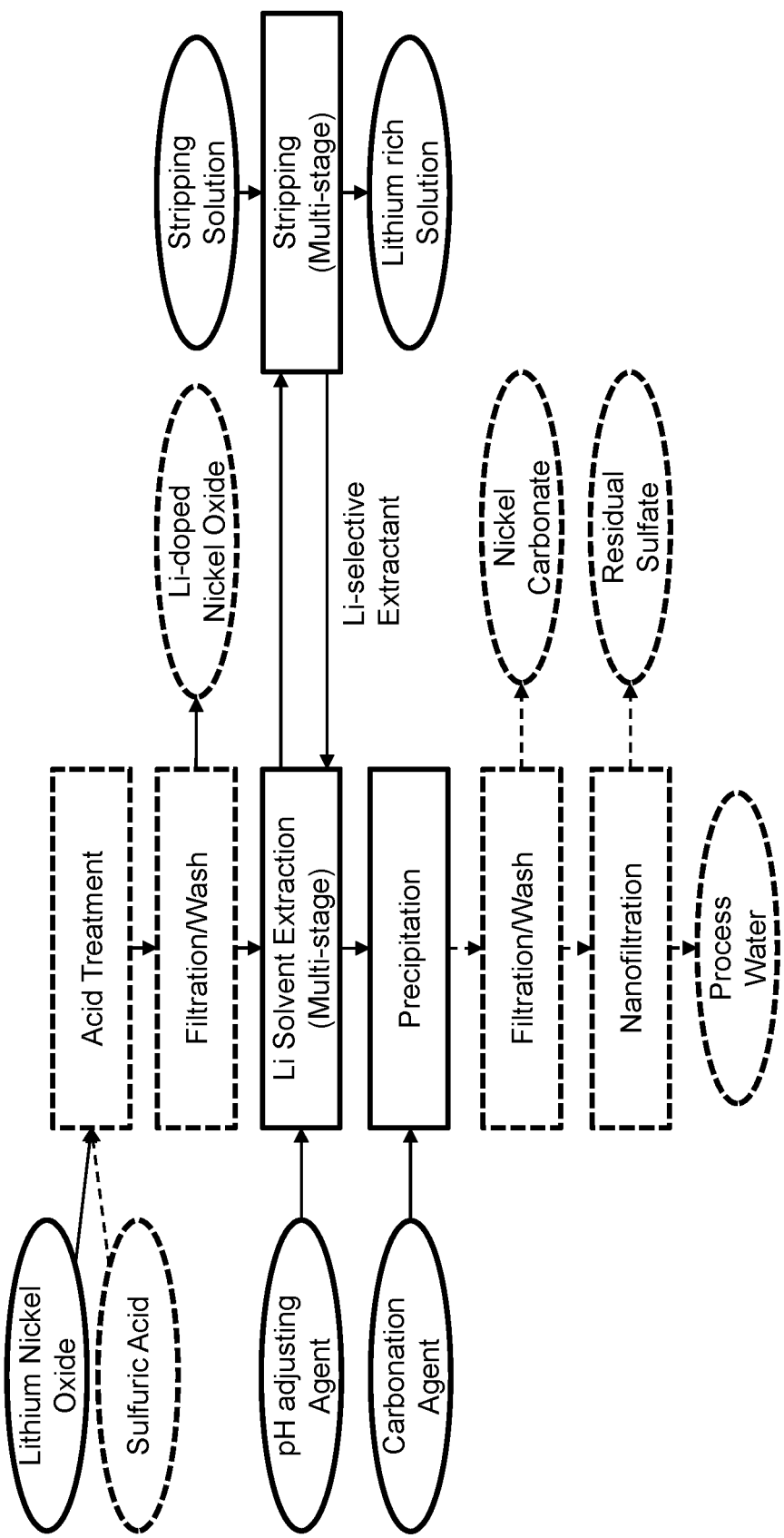
FIG. 3 is a schematic of an illustrative process as provided herein according to some aspects.

The resulting lithium poor material ($Ni^{2+}$ solution) obtained as a result of the extraction stages is transferred to a holding tank (Tank2) for subsequent recovery of Ni, or transferred directly to a Ni extraction process. Prior to being reintroduced into a subsequent Ni extraction process, the $Ni^{2+}$ solution may be subjected to ion exchange. A Ni extraction process is optionally a direct precipitation of the Ni from the $Ni^{2+}$ solution (FIG. 3) The result of the $Ni^{2+}$ extraction or precipitation are a Ni salt that may also serve as a recycled material for the production of additional materials or goods.

To provide greater detail, in some aspects of the disclosure, a process for extracting lithium and optionally nickel from a Nickel(II)/Lithium(I) ($Ni^{2+}/Li^+$) waste material includes providing a $Ni^{2+}/Li^+$ solution, optionally waste material, comprising an amount of lithium and an amount of nickel. The lithium present in the $Ni^{2+}/Li^+$ solution may be derived from any suitable lithium-containing and any suitable nickel-containing compound. Illustratively, a $Ni^{2+}/Li^+$ solution may be a waste stream as the result of delithiation of an electrochemically active material used in electrochemical cells and produced according to delithiation methods recognized in the art of illustratively, $LiNiO_2$ materials, NCM materials, or others. Optionally, the $Ni^{2+}/Li^+$ solution results from the delithiation of $LiNiO_2$ materials, or $LiNiMO_2$ where M is any of one of many metals such as Mn, Mg, Al, Co, and/or most any other transition metal or post transition metal. Other examples include $LiNiCoAlO_2$, $LiNiCoAlMO_2$ where M is optionally a transition metal, post-transition metal, Mg, or other. A transition metal may be any transition metal suitable for use in an electrochemical cell. Illustrative examples of a transition metal include, but are not limited to Ni, Co, Mn, Ti, Zr, Nb, Hf, V, Cr, Sn, Cu, Mo, W, Fe, Si, B, or other transition metals.

The production of electrochemically active materials or the other production of a $Ni^{2+}/Li^+$ solution may be by the combination of a lithium compound and a nickel compound. Optionally, a lithium compound is a lithium hydroxide, lithium oxide, lithium carbonate, lithium nitrate, lithium sulfate, lithium acetate, lithium peroxide, lithium hydrogen carbonate, or a lithium halide, or any combination thereof.

The amount of lithium present in the $Ni^{2+}/Li^+$ solution, according to some aspects, may range from about 5 g/L to about 250 g/L, optionally from about 20 g/L to about 150 g/L. In some aspects, the amount of lithium present in the $Ni^{2+}/Li^+$ solution is from about 10 g/L to about 200 g/L, about 15 g/L to about 175 g/L, about 20 g/L to about 150 g/L, about 25 g/L to about 125 g/L, about 30 g/L to about 100 g/L, about 40 g/L to about 75 g/L, or about 50 g/L to about 60 g/L.

In some aspects of the disclosure, the nickel present in the $Ni^{2+}/Li^+$ solution may be derived from any suitable nickel-containing compound such as hydroxide, oxide, oxyhydroxide, carbonate, or nitrate of Ni.

The amount of nickel present in the $Ni^{2+}/Li^+$ solution, according to some aspects, may range from about 5 g/L to about 400 g/L, optionally from about 20 g/L to about 200 g/L. In some aspects, the amount of lithium present in the $Ni^{2+}/Li^+$ solution is from about 10 g/L to about 300 g/L, about 15 g/L to about 250 g/L, about 20 g/L to about 200 g/L, about 25 g/L to about 150 g/L, about 30 g/L to about 100 g/L, about 40 g/L to about 75 g/L, or about 50 g/L to about 60 g/L.

A $LiNiO_2$ material may be delithiated in such a way so as to yield a chloride matrix with Li and Ni that may be used for subsequent isolation per the processes as described herein. Optionally, delithiation is performed substantially by processes as recognized in the art, illustratively those as described in U.S. Pat. No. 8,298,706 such as by subjecting the $LiNiO_2$ materials to aqueous hydrochloric acid or perchloric acid at a desired delithiation temperature. The aqueous acid solution can have a concentration of 1 mole/liter or more (e.g., 3 mole/liter or more, 6 mole/liter or more, 8 mole/liter or more, or 10 mole/liter or more) and/or 12 mole/liter or less (e.g., 10 mole/liter or less, 8 mole/liter or less, 6 mole/liter or less, or 3 mole/liter or less). Optionally, the concentration of the aqueous acid solution can be between 0.1 mole/liter and 10 mole/liter (e.g., between 1 mole/liter and 10 mole/liter, or between 4 mole/liter and 8 mole/liter). Optionally, a delithiation temperature is 0° C. to 5° C., but in some aspects a delithiation temperature is 10° C. or greater, optionally 60° C. or greater. The resulting slurry is mixed at the delithiation temperature for about 20-40 hours, the solids allowed to settle followed by isolation and washing of the solid delithiated material optionally for use in cathode production. The removed supernatant from the wash may be used as a waste stream $Ni^{2+}/Li^+$ solution in the further aspects of the processes as provided herein.

In some aspects of the disclosure, the process for extracting nickel and/or lithium from a $Ni^{2+}/Li^+$ solution includes treating the $Ni^{2+}/Li^+$ solution in one or more extraction stages with a pH adjusting agent to adjust the pH of the $Ni^{2+}/Li^+$ solution to between about 1.0 to about 10.0. Suitable pH adjusting agents may include hydrochloric acid, calcium oxide, sodium hydroxide, potassium hydroxide, aqua ammonia, or combinations thereof. Optionally, a pH adjusting agent excludes pH adjusting agents that will introduce into the system a cation that will confound recovery of one or more metals from the desired solution. Optionally, a pH adjusting agent excludes a sodium salt. Optionally, a pH adjusting agent excludes a potassium salt. Optionally, a pH adjusting agent excludes a calcium salt.

Optionally, the pH adjusting agent is provided at an amount and concentration to adjust the pH of the $Ni^{2+}/Li^+$ solution at one or more stages of extraction of $Li^+$ to between about 1.0 to about 10.0. Optionally, a pH of the $Ni^{2+}/Li^+$ solution following contact with the pH adjusting agent is about 1.0 to about 9.5, about 1.0 to about 9.0, about 1.0 to about 8.5, about 1.0 to about 8.0, about 1.0 to about 7.5, about 1.0 to about 7.0, about 1.0 to about 6.5, about 1.0 to about 6.0, or about 1.0 to about 5.5. Optionally, the pH adjusting agent is introduced at one or more extraction stages to adjust the pH of the solution to at or below about 3.0, about 3.5, about 4.0, about 4.5, about 5.0, about 5.5, about 6.0, about 6.5, about 7.0, about 7.5, or about 8.0. Optionally, the pH is adjusted at one or more extraction stages by contact with the pH adjusting agent so as to produce or maintain the pH of the extraction solution to about 1.0 to about 7.0.

In some aspects of the disclosure, the process for extracting nickel and lithium from a $Ni^{2+}/Li^+$ solution further includes treating the $Ni^{2+}/Li^+$ solution with a lithium selective extractant, the lithium selective extractant suitable to extract lithium from the $Ni^{2+}/Li^+$ solution at the desired pH to thereby produce a lithium poor solution with less Li that the $Ni^{2+}/Li^+$ solution.

Optionally, a lithium selective extractant is added to 10% to 40% v/v, optionally 10% to 30% v/v, optionally 15% to 25% v/v. Optionally, the lithium selective extractant is added at a volume percent of 10%, 15%, 20%, 25%, or 30%. The solution of lithium selective extractant is optionally added to the forgoing volume percent from a substantially purified or saturated solution of the lithium selective extractant.

A lithium selective extractant is optionally an anion containing extractant capable of extracting Li into an organic phase. Illustrative examples of such lithium selective extractants include, but are not limited to phosphinic acid, phosphonic acid, a phosphoric acid, a carboxylic acid, a hydroxamic acid, a beta-diketone, a trialkylphosphine oxide, or any combination thereof. More specific exemplary lithium selective extractants include 2-hydroxy-5-nonylacetophenone oxime (LIX 84-I), LIX 54-100, LIX 55 (BASF), CYANEX 936 (SOLVAY) and CYANEX 923 (SOLVAY) that is a mixture of four trialkylphosphine oxides $R_3P(O)$, $R_2R'P(O)$, $RR'_2(O)$, and $R'_3P(O)$ where R is a linear C8-alkyl radical and R' is a linear C6-alkyl radical, or any blend of two or more of any of these reagents. In some aspects, the lithium selective extractant is an acid. Suitable acids may include a 2-ethylhexyl phosphonic acid mono-2-ethylhexyl ester, neodecanoic acid, or combinations thereof.

The lithium selective extractant may be added in one or more extraction stages to the $Ni^{2+}/Li^+$ solution from about 5 percent by volume to about 50 percent by volume, based on the total volume of the $Ni^{2+}/Li^+$ solution. Other suitable ranges of the lithium selective extractant may include from about 10 percent by volume to about 45 percent by volume, from about 15 percent by volume to about 40 percent by volume, or from about 20 percent by volume to about 30 percent by volume, based on the total volume of the $Ni^{2+}/Li^+$ solution.

In further aspects of the disclosure, the lithium selective extractant further includes a hydrocarbon as a diluent. Suitable hydrocarbons may include kerosene, paraffin, naphthene, or combinations thereof. The lithium selective extractant and hydrocarbon may be present together at varying ratios. Optionally, ratios of nickel selective extractant to hydrocarbon may range from about 1:99 by volume to about 99:1. Optionally the lithium selective extractant to hydrocarbon ratio is about 50:50 by volume, optionally 20:80 by volume. Optionally, the lithium selective extractant to hydrocarbon ratio is from about 2:98 percent by volume to about 45:55 by volume, about 3:97 by volume to about 40:60 by volume, about 5:95 by volume to about 40:60 by volume, about 7:93 by volume to about 35:65 by volume, or about 10:90 by volume to about 30:70 by volume where each of the lithium selective extractant and hydrocarbon are from a respective substantially isolated or saturated solution of the lithium selective extractant or hydrocarbon.

The processes as provided herein optionally include one or more extraction stages in series or in parallel. Optionally, the number of extraction stages where the lithium selective extractant, pH adjustment, or other contacts the $Ni^{2+}/Li^+$ solution is 1, 2, 3, 4, 5, 6, 7, or more stages. The multi-staging of the processes as provided herein provides rapid and robust extraction of lithium from the $Ni^{2+}/Li^+$ solution. The results of the one or more extraction stages is a lithium rich solution and a lithium poor solution that also includes Ni (e.g. $Ni^{2+}$ solution). The lithium poor solution (or result of the lithium extraction) is optionally less than or equal to 1000 ppm $Li^+$, 500 ppm $Li^+$, 100 ppm $Li^+$, 10 ppm $Li^+$, 9 ppm $Li^+$, 8 ppm $Li^+$, 7 ppm $Li^+$, 6 ppm $Li^+$, 5 ppm $Li^+$, 4 ppm $Li^+$, 3 ppm $Li^+$, 2 ppm $Li^+$, or 1 ppm $Li^+$. The lithium poor solution is optionally subsequently processed for the extraction of nickel from the lithium poor solution.

The lithium poor solution optionally has less than 10 percent the amount of Li in the $Ni^{2+}/Li^+$ solution by weight. Optionally, the lithium poor solution optionally has less than 1 percent the amount of Li in the $Ni^{2+}/Li^+$ solution, optionally less than 0.1 percent, optionally less than 0.01 percent, optionally less than 0.001 percent, optionally less than 0.0001 percent the amount of Li in the $Ni^{2+}/Li^+$ solution by weight.

The lithium rich solution resulting from the extraction steps is optionally subjected to one or more stripping steps to obtain an isolated Li product, optionally in the form of a Li salt. In the one or more stripping steps, the pH of the lithium rich solution is lowered by the combination with an acid such as $H_2SO_4$ or other suitable acid. An acid is optionally added to reduce the pH from the pH of the extraction solution(s) to optionally at or less than about 3.0, optionally 2.0, or lower to thereby exchange hydrogen for the Li in the organic phase and thereby strip the Li from the Li rich solution and move it into an aqueous phase as a Li salt or for subsequent isolation or use. The resulting solution(s) from the one or more strip stages is passed to a collection tank for direct use, cleaning or scrubbing, or may be subjected to further processes whereby the Li may precipitate so as to be collectable and optionally usable for one or more downstream processes or for the formation of other materials.

In some aspects, Li is further precipitated from the resulting Li salt solution as a resulting carbonate or hydroxide, optionally by contact with a carbonation agent. Illustrative carbonation agents may include carbon dioxide plus ammonia, carbon dioxide, sodium carbonate, ammonium carbonate, or combinations thereof. The carbonation agent may be contacted with the Li salt solution in a chamber and allowed to incubate at a desired time and for a desired temperature, optionally −5° C. to 120° C., to allow formation of a lithium carbonate salt. The lithium carbonate may be further washed or otherwise treated, or may be directly employed in the production of cathode electrochemically active materials for use in primary or secondary batteries.

Following precipitation, the resulting Li product may be subsequently filtered from the supernatant and washed so as to form a lithium carbonate or hydroxide that may be directly utilized for subsequent production of materials, optionally for the production of lithiated cathode electrochemically active materials.

The aqueous supernatant is optionally subjected to nanofiltration or other process to separate residual sulfates remaining from the prior Li stripping stage and recover purified water that can then be subsequently used for subsequent stripping in the Li isolation processes.

The provided processes according to some aspects of this disclosure may further include extracting Ni from the lithium poor solution ($Ni^{2+}$ solution). Extracting Ni is optionally performed by direct precipitation of Ni such as with a carbonation agent or a pH adjusting agent to produce a nickel salt. Illustrative carbonation agents may include carbon dioxide plus ammonia, carbon dioxide, sodium carbonate, ammonium carbonate, or combinations thereof. Illustrative pH adjusting agents are any agent that can adjust the pH of the solution to a pH of about 8 to about 12.5, optionally about 10 to about 12.5, optionally sodium hydroxide, lithium hydroxide, potassium hydroxide, ammonium hydroxide, or a combination thereof. The carbonation agent or pH adjusting agent may be contacted with the $Ni^{2+}$ solution in a chamber and allowed to incubate at a desired time and for a desired temperature, optionally −5° C. to 120° C., to allow formation of a nickel salt.

In further aspects, the nickel from the $Ni^{2+}/Li^+$ solution may be isolated prior to isolation of the lithium. Optionally, the $Ni^{2+}/Li^+$ solution is treated with a carbonation agent or a pH adjusting agent to produce a nickel salt. Illustrative carbonation agents may include carbon dioxide plus ammonia, carbon dioxide, sodium carbonate, ammonium carbonate, or combinations thereof. Illustrative pH adjusting agents are any agent that can adjust the pH of the solution to a pH of about 8 to about 12.5, optionally about 10 to about 12.5. The carbonation agent or pH adjusting agent may be contacted with the $Ni^{2+}/Li^+$ solution in a chamber and allowed to incubate at a desired time and for a desired temperature, optionally −5° C. to 120° C., to allow formation of a nickel salt.

The resulting precipitated Ni product may be subsequently filtered from the supernatant and washed so as to form a Ni material, optionally nickel carbonate, that may be directly utilized for subsequent production of materials, optionally for the production of lithiated cathode electrochemically active materials.

The results of isolation of Ni as a carbonate or hydroxide is a supernatant that includes Ni optionally at less than or equal to 1000 ppm $Ni^{2+}$, 500 ppm $Ni^{2+}$, 100 ppm $Ni^{2+}$, 10 ppm $Ni^{2+}$, 9 ppm $Ni^{2+}$, 8 ppm $Ni^{2+}$, 7 ppm $Ni^{2+}$, 6 ppm $Ni^{2+}$, 5 ppm $Ni^{2+}$, 4 ppm $Ni^{2+}$, 3 ppm $Ni^{2+}$, 2 ppm $Ni^{2+}$, or 1 ppm $Ni^{2+}$.

The supernatant optionally has less than 10 percent the amount of Ni in the $Ni^{2+}$ solution or $Ni^{2+}/Li^+$ solution by weight. Optionally, the supernatant optionally has less than 1 percent the amount of Ni in the $Ni^{2+}$ solution or $Ni^{2+}/Li^+$ solution, optionally less than 0.1 percent, optionally less than 0.01 percent, optionally less than 0.001 percent, optionally less than 0.0001 percent the amount of Ni in the $Ni^{2+}$ solution or $Ni^{2+}/Li^+$ solution by weight.

The resulting nickel poor solution is optionally then treated to further isolate the remaining lithium by optional addition of a pH adjusting agent (if necessary) substantially as described above to produce a nickel poor solution with a pH of about 1.0 to about 10.0. Optionally, a pH of the nickel poor solution following contact with the pH adjusting agent is about 1.0 to about 9.5, about 1.0 to about 9.0, about 1.0 to about 8.5, about 1.0 to about 8.0, about 1.0 to about 7.5, about 1.0 to about 7.0, about 1.0 to about 6.5, about 1.0 to about 6.0, or about 1.0 to about 5.5. Optionally, the pH adjusting agent is introduced at one or more extraction stages to adjust the pH of the solution to at or below about 3.0, about 3.5, about 4.0, about 4.5, about 5.0, about 5.5, about 6.0, about 6.5, about 7.0, about 7.5, or about 8.0. Optionally, the pH is adjusted at one or more extraction stages by contact with the pH adjusting agent so as to produce or maintain the pH of the extraction solution to about 1.0 to about 7.0. A lithium selective extractant is added to the nickel poor solution 10% to 40% v/v, optionally 10% to 30% v/v, optionally 15% to 25% v/v. Optionally, the lithium selective extractant is added at a volume percent of 10%, 15%, 20%, 25%, or 30%. Any lithium selective extractant as otherwise provided herein may be used. The solution of lithium selective extractant is optionally added to the forgoing volume percent from a substantially purified or saturated solution of the lithium selective extractant.

The lithium selective extractant may be added in one or more extraction stages or simply in bulk to the nickel poor solution from about 5 percent by volume to about 50 percent by volume, based on the total volume of the nickel poor solution. Other suitable ranges of the lithium selective extractant may include from about 10 percent by volume to about 45 percent by volume, from about 15 percent by volume to about 40 percent by volume, or from about 20 percent by volume to about 30 percent by volume, based on the total volume of the nickel poor solution. The lithium selective extractant added to the nickel poor solution optionally further includes a hydrocarbon as a diluent. Suitable hydrocarbons may include kerosene, paraffin, naphthene, or combinations thereof. The lithium selective extractant and hydrocarbon may be present together at varying ratios. Optionally, ratios of nickel selective extractant to hydrocarbon may range from about 1:99 by volume to about 99:1. Optionally the lithium selective extractant to hydrocarbon ratio is about 50:50 by volume, optionally 20:80 by volume. Optionally, the lithium selective extractant to hydrocarbon ratio is from about 2:98 percent by volume to about 45:55 by volume, about 3:97 by volume to about 40:60 by volume, about 5:95 by volume to about 40:60 by volume, about 7:93 by volume to about 35:65 by volume, or about 10:90 by volume to about 30:70 by volume where each of the lithium selective extractant and hydrocarbon are from a respective substantially isolated or saturated solution of the lithium selective extractant or hydrocarbon.

The result of the lithium extraction from the nickel poor solution may be a lithium poor solution with less than or equal to 1000 ppm $Li^+$, 500 ppm $Li^+$, 100 ppm $Li^+$, 10 ppm $Li^+$, 9 ppm $Li^+$, 8 ppm $Li^+$, 7 ppm $Li^+$, 6 ppm $Li^+$, 5 ppm $Li^+$, 4 ppm $Li^+$, 3 ppm $Li^+$, 2 ppm $Li^+$, or 1 ppm $Li^+$.

The aqueous supernatant is optionally subjected to nanofiltration or other process to recover purified water that can then be subsequently used for subsequent stripping in the Li isolation processes.

The extracted nickel, lithium, or both are optionally washed, the liquid materials filtered, and the products suitable for use in one or more downstream processes.

The processes and lithium and/or nickel produced thereby achieve an extraction method that creates excellent recovery amounts resulting in materials that me be recycled or sold for use in lithium-ion batteries.

Various modifications of the present disclosure, in addition to those shown and described herein, will be apparent to those skilled in the art of the above description. Such modifications are also intended to fall within the scope of the appended claims.

It is appreciated that all reagents are obtainable by sources known in the art unless otherwise specified.

This description of particular aspect(s) is merely exemplary in nature and is in no way intended to limit the scope of the disclosure, its application, or uses, which may, of course, vary. The materials and processes are described with relation to the non-limiting definitions and terminology included herein. These definitions and terminology are not designed to function as a limitation on the scope or practice of the disclosure, but are presented for illustrative and descriptive purposes only. While the processes or compositions are described as an order of individual steps or using specific materials, it is appreciated that steps or materials may be interchangeable such that the description of the disclosure may include multiple parts or steps arranged in many ways as is readily appreciated by one of skill in the art.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first 'element'", "component," "region," "layer," or "section" discussed below could be termed a second (or other) element, component, region, layer, or section without departing from the teachings herein.

The terminology used herein is for the purpose of describing particular aspects of the disclosure only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

Patents, publications, and applications mentioned in the specification are indicative of the levels of those skilled in the art to which the disclosure pertains. These patents, publications, and applications are incorporated herein by reference to the same extent as if each individual patent, publication, or application was specifically and individually incorporated herein by reference.

The foregoing description is illustrative of particular aspects of the disclosure, but is not meant to be a limitation upon the practice thereof.

The invention claimed is:

1. A process comprising:
   (A) providing a $Ni^{2+}/Li^+$ solution comprising a chloride ion and an amount of lithium and an amount of nickel;
   (B) treating the $Ni^{2+}/Li^+$ solution with a pH adjusting agent to adjust the pH of the $Ni^{2+}/Li^+$ solution to range from 1.0 to 6.0;
   (C) treating the $Ni^{2+}/Li^+$ solution with a lithium selective extractant-to extract lithium from the $Ni^{2+}/Li^+$ solution at said pH to thereby produce a lithium poor solution containing less $Li^+$ than contained in said $Ni^{2+}/Li^+$ solution; and
   (D) treating the lithium poor solution with a carbonate to precipitate Ni from the lithium poor solution.

2. The process of claim 1, wherein the carbonate is selected from the group consisting of sodium carbonate, ammonium carbonate, a bicarbonate, and a combination of at least two of the forgoing.

3. The process of claim 1 further comprising filtering and washing the Ni precipitated from the lithium poor solution.

4. The process of claim 1, wherein the lithium poor solution comprises less than 1000 parts per million $Li^+$.

5. The process of claim 1, wherein the pH adjusting agent is selected from the group consisting of hydrochloric acid, sodium hydroxide, potassium hydroxide, ammonium hydroxide, and a combination of at least two of the foregoing.

6. The process of claim 1, wherein the lithium selective extractant comprises a phosphinic acid, phosphonic acid, a phosphoric acid, a carboxylic acid, a hydroxamic acid, a beta-diketone, a trialkylphosphine oxide, or any combination thereof.

7. The process of claim 6, wherein the extractant is selected from the group consisting of 1-phenyldecane-1,3-dione, a mixture of four trialkylphosphine oxides $R_3P(O)$, $R_2R'P(O)$, $RR'_2(O)$, and $R'_3P(O)$ where R is a linear C8-alkyl radical and R' is a linear C6-alkyl radical, and a tri-n-hexylphosphine oxide/tri-n-octylphosphine oxide compound having CAS number 100786-00-3, and any blend thereof.

8. The process of claim 1, wherein the lithium selective extractant further comprises a hydrocarbon.

9. The process of claim 8, wherein the hydrocarbon is selected from the group consisting of kerosene, paraffin, naphthene, and a combination of at least two of the forgoing.

10. The process of claim 8, wherein the lithium selective extractant and hydrocarbon are present at 10:90 percent by volume to 50:50 percent by volume.

11. The process of claim 1, wherein step (C) is performed at a pH of about 1.0 to about 6.0.

12. The process of claim 1, wherein steps (B) and (C) are repeated.

13. The process of claim 1, wherein prior to step (A) the process further comprises delithiating a $LiNiO_2$ compound with hydrochloric acid or perchloric acid.

14. A process comprising:
    (A) providing a $Ni^{2+}/Li^+$ solution comprising a chloride ion and an amount of lithium and an amount of nickel;
    (B) treating the $Ni^{2+}/Li^+$ solution with a carbonation agent or pH adjusting agent to precipitate a nickel salt, thereby producing a nickel poor solution;
    (C) treating the nickel poor solution with a pH adjusting agent to adjust the pH of the nickel poor solution to range from 1.0 to 6.0; and
    (D) treating the nickel poor solution with a lithium selective extractant to extract lithium from the nickel poor solution at said pH to thereby produce a lithium poor solution containing less $Li^+$ than contained in said nickel poor solution;
    wherein the lithium selective extractant comprises a phosphinic acid, a carboxylic acid, a hydroxamic acid, a trialkylphosphine oxide, or any combination thereof; and
    wherein step (D) is performed at a pH of about 1.0 to about 6.0.

15. The process of claim 14 wherein the carbonation agent is selected from the group consisting of carbon dioxide ($CO_2$), sodium carbonate, ammonium carbonate, a bicarbonate, and a combination of at least two of the forgoing; or
    wherein pH adjusting agent is selected from the group consisting of sodium hydroxide, lithium hydroxide, potassium hydroxide, and ammonium hydroxide.

16. The process of claim 14 further comprising filtering and washing the nickel salt.

17. The process of claim 14 wherein the nickel poor solution comprises less than 1000 parts per million $Ni^{2+}$.

18. The process of claim 14, wherein the lithium poor solution comprises less than 1000 parts per million $Li^+$.

19. The process of claim 14, wherein the lithium poor solution comprises less than 10 parts per million $Li^+$.

20. The process of claim 14, wherein the pH adjusting agent is selected from the group consisting of hydrochloric acid, lithium hydroxide, sodium hydroxide, potassium hydroxide, ammonium hydroxide, and a combination of at least two of the foregoing.

21. The process of claim 14, wherein the extractant is selected from the group consisting of 1-phenyldecane-1,3-dione, a mixture of four trialkylphosphine oxides $R_3P(O)$, $R_2R'P(O)$, $RR'_2(O)$, and $R'_3P(O)$ where R is a linear C8-alkyl radical and R' is a linear C6-alkyl radical, and a tri-n-hexylphosphine oxide/tri-n-octylphosphine oxide compound having CAS number 100786-00-3, and any blend thereof.

22. The process of claim 14, wherein the lithium selective extractant further comprises a hydrocarbon.

23. The process of claim 22, wherein the hydrocarbon is selected from the group consisting of kerosene, paraffin, naphthene, and a combination of at least two of the forgoing.

24. The process of claim 22, wherein the lithium selective extractant and hydrocarbon are present at 10:90 percent by volume to 50:50 percent by volume.

25. The process of claim 14, wherein steps (C) and (D) are repeated.

26. The process of claim 14, wherein prior to step (A) the process further comprises delithiating a $LiNiO_2$ compound with hydrochloric acid or perchloric acid.

* * * * *